US012651807B2

(12) United States Patent
Qi et al.

(10) Patent No.: US 12,651,807 B2
(45) Date of Patent: Jun. 9, 2026

(54) CYLINDRICAL BATTERY

(71) Applicant: CALB Group Co., Ltd., Jiangsu (CN)

(72) Inventors: Binwei Qi, Luoyang (CN); Yawei Wang, Changzhou (CN); Qianqian Sun, Changzhou (CN); Lulu Zhang, Changzhou (CN)

(73) Assignee: CALB Group Co., Ltd., Jiangsu (CN)

( * ) Notice: Subject to any disclaimer, the term of this patent is extended or adjusted under 35 U.S.C. 154(b) by 589 days.

(21) Appl. No.: 18/186,955

(22) Filed: Mar. 21, 2023

(65) Prior Publication Data

US 2024/0128596 A1 Apr. 18, 2024

(30) Foreign Application Priority Data

Oct. 13, 2022 (CN) .......................... 202211256123.2

(51) Int. Cl.
| | |
|---|---|
| *H01M 50/533* | (2021.01) |
| *H01M 10/0587* | (2010.01) |
| *H01M 50/107* | (2021.01) |
| *H01M 50/538* | (2021.01) |

(52) U.S. Cl.
CPC ..... *H01M 50/533* (2021.01); *H01M 10/0587* (2013.01); *H01M 50/107* (2021.01); *H01M 50/538* (2021.01)

(58) Field of Classification Search
None
See application file for complete search history.

(56) References Cited

U.S. PATENT DOCUMENTS

2022/0231345 A1* 7/2022 Hwangbo ......... H01M 50/3425

FOREIGN PATENT DOCUMENTS

| CN | 114759317 | | 7/2022 | |
|---|---|---|---|---|
| CN | 217062434 | | 7/2022 | |
| CN | 114975859 | | 8/2022 | |
| CN | 114975859 | A * | 8/2022 | .............. H01M 4/13 |
| CN | 217444585 | | 9/2022 | |
| CN | 217444585 | U * | 9/2022 | |

(Continued)

OTHER PUBLICATIONS

Chen, Yan-bing; English Translation of CN-114975859-A, 2022 (Year: 2022).*

(Continued)

*Primary Examiner* — Christopher P Domone
*Assistant Examiner* — Brennan M Stewart
(74) *Attorney, Agent, or Firm* — JCIP GLOBAL INC.

(57) ABSTRACT

The disclosure relates to the technical field of batteries and provides a cylindrical battery including a winding cell. The winding cell includes a winding cell body and a first tab extending from one side of the winding cell body. The winding cell body is wound to form a central hole. In a radial direction of the central hole, the first tab includes a plurality of single tabs, and the plurality of single tabs form a first region. Herein, heights of the plurality of single tabs in the first region gradually increase. A difference value between a maximum height difference value and a minimum height difference value between adjacent single tabs in the radial direction of the central hole is less than or equal to 0.5 mm. The height of each of the single tabs is a dimension of the single tab in a lead-out direction thereof.

11 Claims, 5 Drawing Sheets

(56) References Cited

FOREIGN PATENT DOCUMENTS

EP          4044336          8/2022

OTHER PUBLICATIONS

Zeng, Shi-zhe; English Translation of CN-21744585-U, 2022 (Year: 2022).*

"Search Report of Europe Counterpart Application", issued on Aug. 30, 2023, p. 1-p. 9.

"Examination report of India Counterpart Application", issued on Jan. 19, 2026, p. 1-p. 6.

* cited by examiner

CYLINDRICAL BATTERY

CROSS-REFERENCE TO RELATED APPLICATION

This application claims the priority of China patent application serial no. 202211256123.2, filed on Oct. 13, 2022. The entirety of the above-mentioned patent application is hereby incorporated by reference herein and made a part of this specification.

BACKGROUND

Technical Field

The disclosure relates to the technical field of batteries, and in particular, relates to a cylindrical battery.

Description of Related Art

In the related art, the winding cell of the cylindrical battery is a winding type winding cell. The tabs on the winding cell may reliably contact the adjacent single tabs through bundling. However, due to the limitation of the tab structure, the flatness of the top portions of the tabs may be poor.

SUMMARY

The disclosure provides a cylindrical battery including a winding cell.

The winding cell includes a winding cell body and a first tab extending from one side of the winding cell body. The winding cell body is wound to form a central hole. In a radial direction of the central hole, the first tab includes a plurality of single tabs, and the plurality of single tabs form a first region.

Herein, heights of the plurality of single tabs in the first region gradually increase. A difference value between a maximum height difference value and a minimum height difference value between adjacent single tabs in the radial direction of the central hole is less than or equal to 0.5 mm. The height of each of the single tabs is a dimension of the single tab in a lead-out direction thereof.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
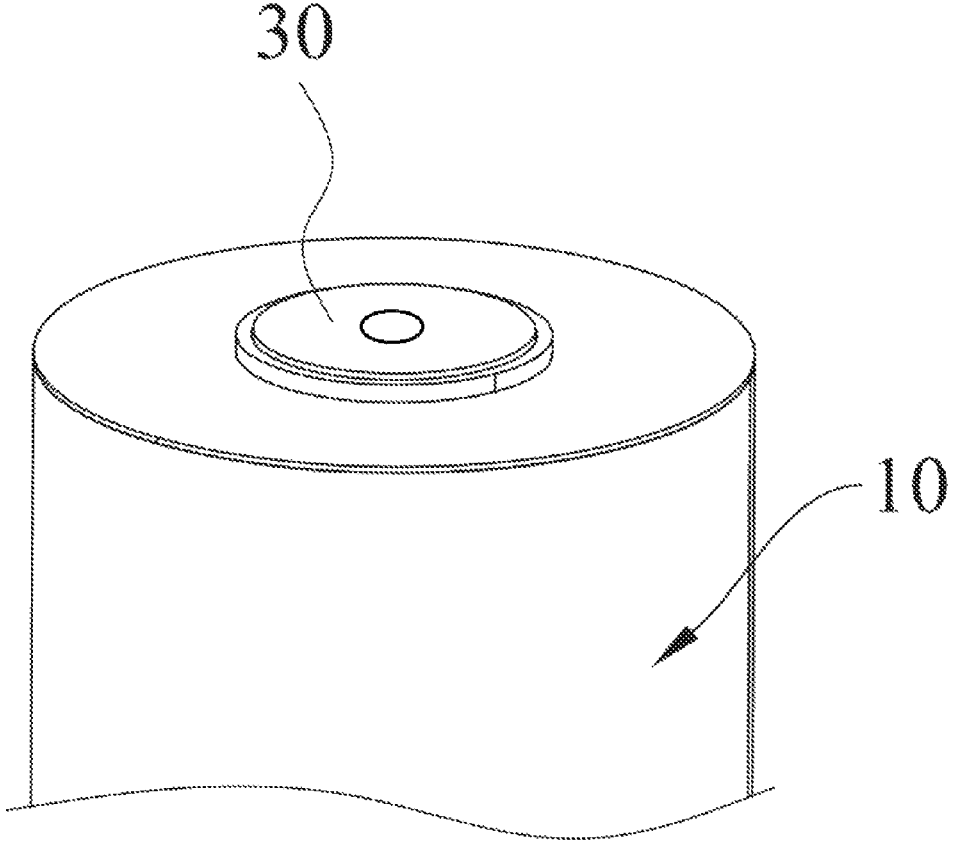
FIG. 1 is a schematic view illustrating a structure of a battery according to an exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

An embodiment of the disclosure provides a cylindrical battery. With reference to FIG. 1 to FIG. 5, the cylindrical battery includes a winding cell 20. The winding cell 20 includes a winding cell body 21 and a first tab 22 extending from one side of the winding cell body 21. The winding cell body 21 is wound to form a central hole 211. In a radial direction of the central hole 211, the first tab 22 includes a plurality of single tabs 221, and the plurality of single tabs 221 form a first region 24. Herein, heights of the plurality of single tabs 221 in the first region 24 gradually increase. Further, a difference value between a maximum height difference value and a minimum height difference value between adjacent single tabs 221 in the radial direction of the central hole 211 is less than or equal to 0.5 mm. The height of each of the single tabs 221 is a dimension of the single tab 221 in a lead-out direction thereof.

The cylindrical battery provided by an embodiment of the disclosure includes the winding cell 20. The winding cell 20 includes the winding cell body 21 and the first tab 22 extending from one side of the winding cell body 21. Further, the winding cell body 21 is wound to form the central hole 211. The first tab 22 may be formed by the plurality of single tabs 221, and the plurality of single tabs 221 form the first region 24. The heights of the plurality of single tabs 221 in the first region 24 gradually increase. Further, the difference value between the maximum height difference value and the minimum height difference value between adjacent single tabs 221 in the radial direction of the central hole 211 is less than or equal to 0.5 mm. In this way, when the single tabs 221 are bundled, top portions of the single tabs 221 may be substantially flush, so that the subsequent connection of the first tab 22 may be satisfied, and false connection may be avoided. The overall current-passing capability of the winding cell 20 is enhanced, and the performance of the cylindrical battery is thus improved.

It should be noted that the cylindrical battery is a wound battery, and the winding cell 20 may be wound on a winding cell structure. In this way, after the winding cell 20 is formed by winding, the winding cell structure is separated from the winding cell 20, and the central hole 211 is thereby formed. For instance, the winding cell structure may be a cylinder, and a cylindrical central hole 211 is thereby formed.

Figure 4:
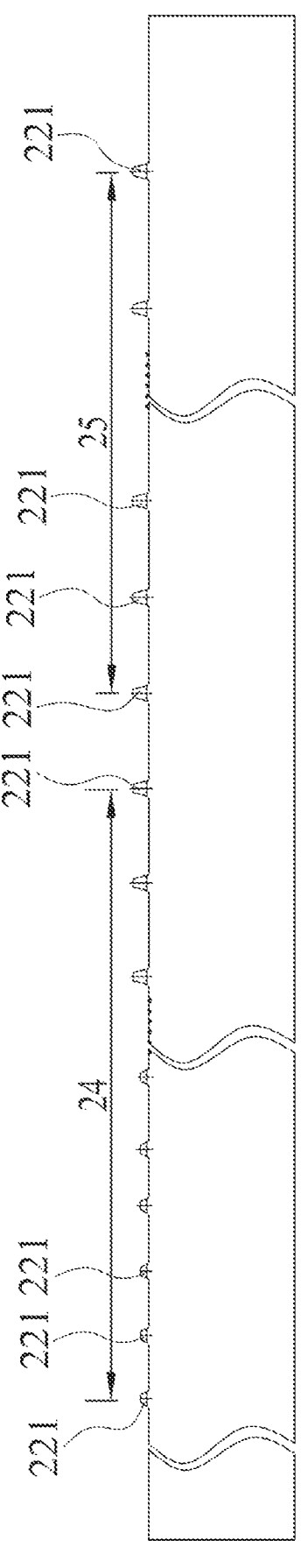
FIG. 4 is a schematic view illustrating a partially expanded structure of the winding cell of the battery according to an exemplary embodiment.

After winding to form the winding cell 20, the first tab 22 on the winding cell body 21 may be formed by the plurality of single tabs 221, and at least part of the plurality of single tabs 221 is divided into the first region 24. As shown in FIG. 4, the heights of the plurality of single tabs 221 in the first region 24 gradually increase. Further, the difference value between the maximum height difference value and the minimum height difference value between adjacent single tabs 221 in the radial direction of the central hole 211 is less than or equal to 0.5 mm. When the plurality of single tabs 221 are bundled, that is, in the process of connecting the independent single tabs 221 together, the single tabs 221 with greater heights may be gathered towards the single tabs 221 with smaller heights. In this way, top ends of the plurality of single tabs 221 in the first region 24 are substantially flush with each other. As such, when the first tab 22 is subsequently connected to an external structure, the stability of the connection can be ensured. For instance, when the first tab 22 is welded to a terminal structure, a stable welding plane between the first tab 22 and the terminal structure may be ensured. False welding between the first tab 22 and the terminal structure is prevented from occurring, so that the current-passing capability between the first tab 22 and the terminal structure is improved. The connection between the first tab 22 and the terminal structure may be made through a connecting piece.

The difference value between the maximum height difference value and the minimum height difference value between adjacent single tabs 221 in the radial direction of the central hole 211 may be basically equal to 0. Further, the difference value between the maximum height difference value and the minimum height difference value between adjacent single tabs 221 in the radial direction of the central hole 211 may be 0.001 mm, 0.01 mm, 0.02 mm, 0.03 mm, 0.04 mm, 0.05 mm, 0.06 mm, 0.07 mm, 0.08 mm, 0.09 mm, 0.1 mm, 0.2 mm, 0.5 mm, 1 mm, 1.2 mm, 1.5 mm, 2 mm, 2.2 mm, 2.5 mm, 3 mm, 3.5 mm, 4 mm, 4.5 mm, 4.6 mm, 4.7 mm, 4.8 mm, 4.9 mm, or 5 mm and so on.

The height of each of the single tabs 221 is the dimension of the single tab 221 in the lead-out direction thereof. That is, the height of each of the single tabs 221 is an extension length of the single tab 221. Further, it can be considered that the single tabs 221 are straightened in a centerline direction of the central hole 211, and the dimension of each of the single tabs 221 in the centerline direction of the central hole 211 may be measured and obtained accordingly.

In an embodiment, the heights of the plurality of single tabs 221 in the first region 24 gradually increase to form an arithmetic progression. When the plurality of single tabs 221 are bundled, that is, in the process of connecting the independent single tabs 221 together, the single tabs 221 with greater heights may be gathered towards the single tabs 221 with smaller heights. In this way, the top ends of the plurality of single tabs 221 in the first region 24 are substantially flush with each other.

In an embodiment, in the radial direction of the central hole 211, the heights of the plurality of single tabs 221 in the first region 24 gradually increase to form an arithmetic progression. That is, the height of the single tab 221 closest to the central hole 211 in the first region 24 is the smallest, and the height of the single tab 221 farthest from the central hole 211 in the first region 24 is the largest. When the plurality of single tabs 221 are gathered, it is necessary to make the single tabs 221 gather towards a direction close to the central hole 211, so as to ensure that the top ends of the plurality of single tabs 221 in the first region 24 are substantially flush. The radial direction of the central hole 211 refers to the direction expanding outwards from the center of the central hole 211.

In an embodiment, in the direction opposite to the radial direction of the central hole 211, the heights of the plurality of single tabs 221 in the first region 24 gradually increase to form an arithmetic progression. That is, the height of the single tab 221 closest to the central hole 211 in the first region 24 is the largest, and the height of the single tab 221 farthest from the central hole 211 in the first region 24 is the smallest. When the plurality of single tabs 221 are gathered, it is necessary to make the single tabs 221 gather towards a direction away from the central hole 211, so as to ensure that the top ends of the plurality of single tabs 221 in the first region 24 are substantially flush. The radial direction of the central hole 211 refers to the direction expanding outwards from the center of the central hole 211. Therefore, the direction opposite to the radial direction of the central hole 211 is the direction extending from a peripheral outer edge of the winding cell body 21 to the center of the central hole 211.

In an embodiment, a difference value between the single tab 221 with the largest height and the single tab 221 with the smallest height in the first region 24≥0.08 mm. Therefore, by controlling the tolerance of the arithmetic progression formed by the plurality of single tabs 221 in the first region 24, it can be ensured that the number of single tabs 221 in the first region 24 is quite large, so as to ensure that the first tab 22 can have a reliable thickness. In this way, during the welding process of the first tab 22, the problem of the first tab 22 being welded through is avoided.

In an embodiment, the first tab 22 is a positive tab, and the tolerance of the arithmetic progression formed by the heights of the single tabs 221 in the first region 24 is 0.2 mm to 0.4 mm. Therefore, it can be ensured that the plurality of single tabs 221 can form a reliable positive tab, and the positive tab can have a relatively large height. Therefore, it is ensured that the positive tab can have a reliable current-passing capability, so that the positive tab can form a reliable connection with an external structure, and the safe use performance of the battery can be improved.

The first tab 22 is a positive tab, and the tolerance of the arithmetic progression formed by the heights of the single tabs 221 in the first region 24 may be 0.2 mm, 0.22 mm, 0.25 mm, 0.28 mm, 0.3 mm, 0.33 mm, 0.35 mm, 0.38 mm, 0.39 mm, or 0.4 mm and so on.

In an embodiment, the first tab 22 is a negative tab, and the tolerance of the arithmetic progression formed by the heights of the plurality of single tabs 221 in the first region 24 is 0.1 mm to 0.3 mm. Therefore, it can be ensured that the plurality of single tabs 221 can form a reliable negative tab, and the negative tab can have a relatively small height. In this way, it is ensured that the negative tab can be conveniently connected to the external structure, and the forming efficiency of the cylindrical battery is improved.

The first tab 22 is a negative tab, and the tolerance of the arithmetic progression formed by the heights of the single tabs 221 in the first region 24 may be 0.1 mm, 0.12 mm, 0.15 mm, 0.18 mm, 0.2 mm, 0.23 mm, 0.25 mm, 0.28 mm, 0.29 mm, or 0.3 mm and so on.

It should be noted that the tolerance of the arithmetic progression formed by the heights of the plurality of single tabs 221 of the positive tab may be equal to the tolerance of the arithmetic progression formed by the heights of the plurality of single tabs 221 of the negative tab. Alternatively, the tolerance of the arithmetic progression formed by the heights of the plurality of single tabs 221 of the positive tab may be greater than the tolerance of the arithmetic progression formed by the heights of the plurality of single tabs 221 of the negative tab. After the single tabs are gathered, the height of the positive tab may be greater than that of the negative tab. The positive tab may be an aluminum tab, and the negative tab may be a copper tab, so as to meet the material requirements of the battery. When there is a height difference between the aluminum tab and the copper tab, it is convenient for the aluminum tab and the copper tab to be welded and connected to the aluminum connecting piece and the copper connecting piece respectively. Moreover, the welding stability may be ensured, and the problem of connection failure may be prevented from occurring. The aluminum tab may be connected to a casing structure 10 through the aluminum connecting piece, and the copper tab may be connected to the terminal structure through the copper connecting piece. Alternatively, the aluminum tab may be connected to the terminal structure through the aluminum connecting piece, and the copper tab may be connected to the casing structure 10 through the copper connecting piece. Alternatively, the aluminum tab may be connected to a first terminal structure through the aluminum connecting piece, and the copper tab may be connected to a second terminal structure through the copper connecting piece, which is not limited herein.

In an embodiment, the first region 24 is formed on one side of the first tab 22 close to the central hole 211. The plurality of single tabs 221 further form a second region 25, and the second region 25 is formed on the other side of the first tab 22 away from the central hole 211. Herein, the heights of the plurality of single tabs 221 in the second region 25 are all equal. Therefore, when the plurality of single tabs 221 in the second region 25 are bundled, it can be ensured that the plurality of single tabs 221 in the second region 25 can have a relatively consistent gathering angle. In this way, a relatively flat top can be formed with the plurality of single tabs 221 in the first region 24 to the greatest extent.

The plurality of single tabs 221 in the first region 24 and the plurality of single tabs 221 in the second region 25 may be bundled in a direction close to the central hole 211. The heights of the plurality of single tabs 221 in the first region 24 gradually increase to form an arithmetic progression, and the heights of the plurality of single tabs 221 in the second region 25 are all equal. Therefore, each of the single tabs 221 of the first tab 22 may be quickly bundled. Moreover, it can also be ensured that the top end of the first tab 22 has a relatively flat plane, so as to facilitate subsequent connection between the first tab 22 and the external structure.

The heights of the plurality of single tabs 221 in the second region 25 are substantially equal actually. That is, the heights of the plurality of single tabs 221 in the second region 25 can be considered to be equal when the inequalities caused by process errors and measurement errors are not included.

As shown in FIG. 4, during the winding process of the winding cell 20, the plurality of single tabs 221 in the first region 24 are wound first, and then the plurality of single tabs 221 in the second region 25 are wound.

In an embodiment, the heights of the single tabs 221 in the first region 24 is smaller than the height of the single tabs 221 in the second region 25. Therefore, the single tabs 221 in the second region 25 may be bundled towards the single tabs 221 in the first region 24. In this way, the top ends formed by the single tabs 221 are ensured to be relatively flat, and the height of the first tab 22 may be ensured, so that current-passing capability of the first tab 22 is ensured.

In an embodiment, a height difference between the height of the single tabs 221 in the second region 25 and the height of the single tab 221 in the first region 24 adjacent to the second region 25 is equal to the tolerance of the arithmetic progression formed by the heights of the plurality of single tabs 221 in the first region 24. Therefore, it can be avoided that after the single tabs 221 in the second region 25 are bundled towards the single tabs 221 in the first region 24, the top ends of the single tabs 221 in the second region 25 may be higher. This ensures that the top end of the first tab 22 formed by the plurality of single tabs 221 is relatively flat.

The battery includes a winding cell and an electrolyte, and the battery is the smallest unit capable of performing electrochemical reactions such as charging/discharging. The winding cell refers to a unit formed by winding a stacked part, and the stacked part includes a first electrode, a separator, and a second electrode. When the first electrode is a positive electrode, the second electrode is a negative electrode. The polarities of the first electrode and the second electrode may be interchanged.

As shown in FIG. 4, a plurality of single tabs 221 are disposed on the first electrode or the second electrode. Herein, the plurality of single tabs 221 form the first region 24 and the second region 25. During the winding process of the winding cell 20, the first region 24 is wound first, and the second region 25 is wound later. Therefore, the heights of the plurality of single tabs 221 in the first region 24 gradually increase to form an arithmetic progression, and the heights of the plurality of single tabs 221 in the second region 25 are all consistent. Further, the heights of the plurality of single tabs 221 in the first region 24 and the first single tab 221 in the second region gradually increase to form an arithmetic progression. After winding the stacked part to form the winding cell 20, the single tabs 221 are bundled to ensure that the top surface formed by each single tab 221 has a relatively high flatness.

It should be noted that the plurality of single tabs 221 may only form the first region 24, and the heights of the plurality of single tabs 221 in the first region 24 gradually increase to form an arithmetic progression, so as to form the first tab 22.

Figure 2:
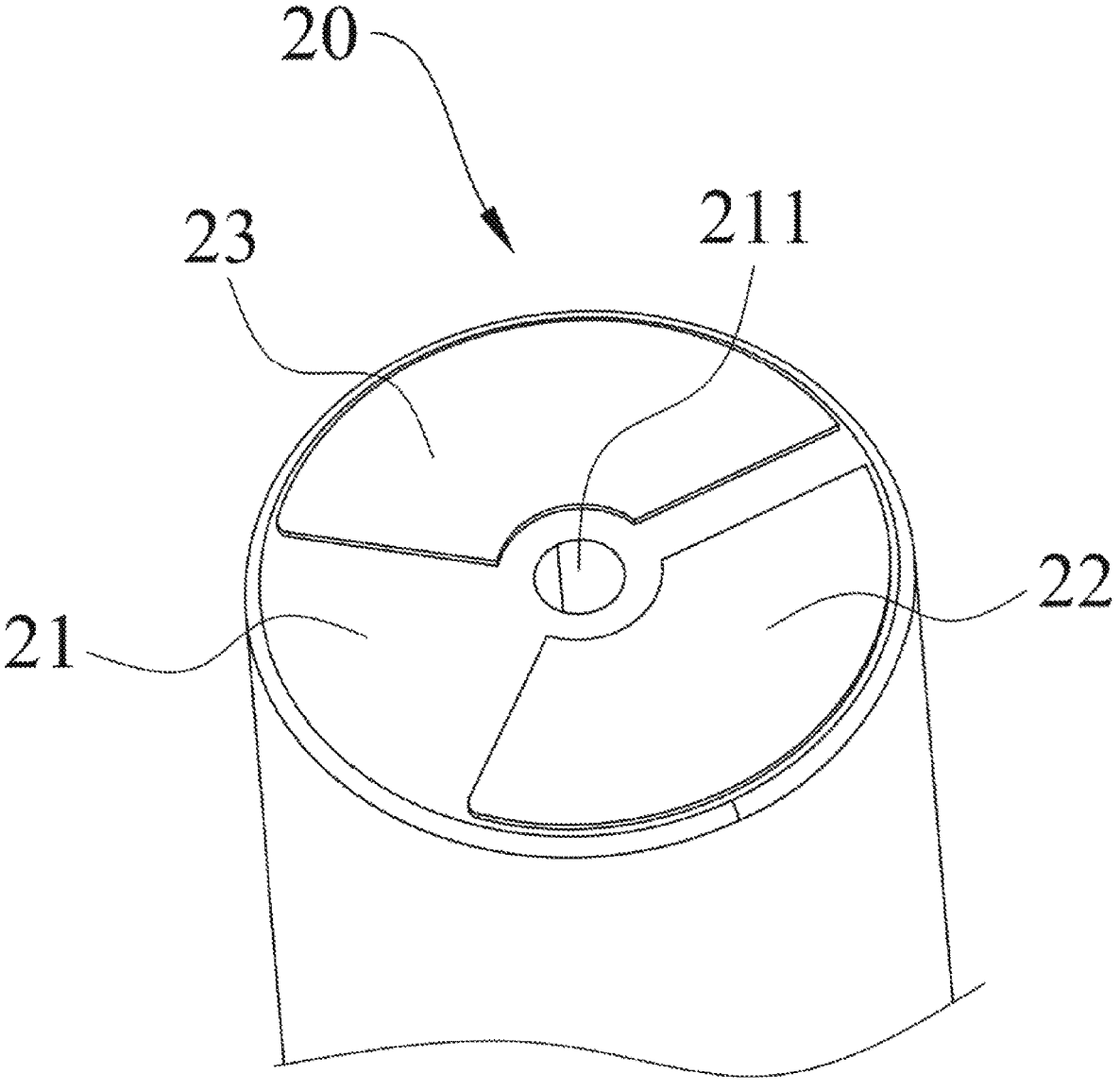
FIG. 2 is a schematic view illustrating a structure of a winding cell of the battery according to an exemplary embodiment.
Figure 3:
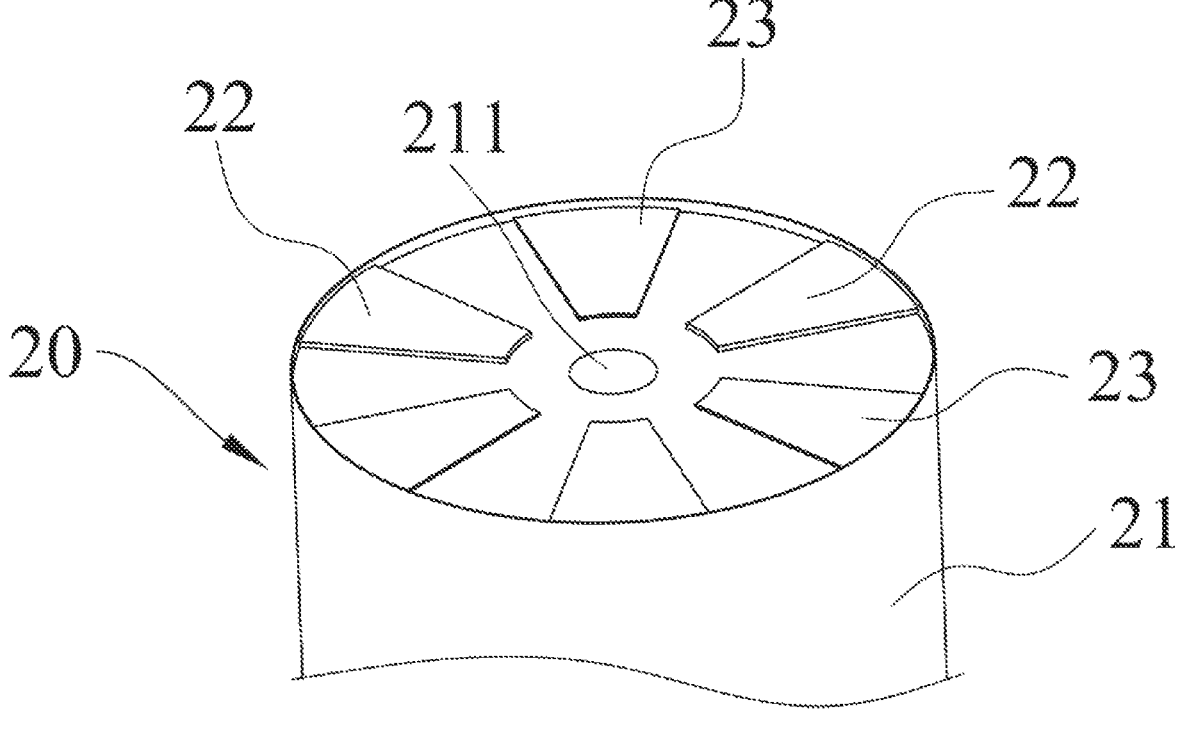
FIG. 3 is a schematic view illustrating the structure of the winding cell of the battery according to another exemplary embodiment.

In an embodiment, as shown in FIG. 2 and FIG. 3, the winding cell 20 further includes a second tab 23. Polarities of the first tab 22 and the second tab 23 spaced apart from each other are opposite. The first tab 22 and the second tab 23 extend from a same side of the winding cell body 21. On the basis of ensuring the insulation between the first tab 22 and the second tab 23, the cumulative height of the first tab 22 and the second tab 23 may be reduced.

The first tab 22 and the second tab 23 have opposite polarities. One of the first tab 22 and the second tab 23 is a positive tab, and the other is a negative tab. By arranging the first tab 22 and the second tab 23 to extend from the same side of the winding cell body 21, the problem of excessive accumulation of height space caused by the extension of the first tab 22 and the second tab 23 from opposite sides of the winding cell body 21 may be prevented from occurring.

In an embodiment, the first tab 22 is spaced apart from the second tab 23 in a circumferential direction of the central hole 211. That is, the first tab 22 and the second tab portion 23 are spaced apart from each other around the central hole 211 in the circumferential direction. In this way, the connection area between the first tab 22 and the second tab 23 is increased to the greatest extent, and it is also ensured that the first tab 22 and the second tab 23 may have a reliable current-passing area.

Regarding the central hole, in an embodiment, as shown in FIG. 2, one first tab 22 is provided, and one second tab 23 is provided. The first tab 22 and the second tab 23 are disposed in the circumferential direction of the central hole 211. In this way, a simple structure is provided, and on the basis of ensuring the insulation gap between the first tab 22 and the second tab 23, it can also be ensured that the first tab 22 and the second tab 23 have a reliable current-passing capability.

The first tab 22 is formed by multiple layers of single tabs, and each layer of single tabs may include one or more single tabs 221. Herein, the heights of the plurality of single tabs 221 on the same layer may be consistent. The second tab 23 is formed by multiple layers of single tabs, and each layer of single tabs may include one or more single tabs. Herein, the heights of the plurality of single tabs on the same layer may be consistent.

In an embodiment, as shown in FIG. 3, a plurality of first tabs 22 are provided, and a plurality of second tabs 23 are provided. The first tabs 22 and the second tabs 23 are arranged in an alternating manner in the circumferential direction of the central hole 211. On the basis of ensuring the insulation gaps between the first tabs 22 and the second tabs 23, it can be ensured that the first tabs 22 and the second tabs 23 have sufficient current-passing areas.

Note that a plurality of first tab portions 22 are provided, and a plurality of second tab portions 23 are provided. Herein, the first tabs 22 may form a plurality of first regions 24 and second regions 25, and the heights of the single tabs 221 of different first regions 24 on the same layer may be the same. Correspondingly, the heights of the single tabs 221 in different second regions 25 located on the same layer may be consistent.

The arrangement of each single tab of the second tab 23 can refer to the arrangement of each single tab 221 of the first tab 22. For instance, when the first tab 22 is a positive tab and the second tab 23 is a negative tab, the tolerance of the arithmetic progression formed by the heights of the plurality of single tabs 221 of the positive tab may be equal to the tolerance of the arithmetic progression formed by the heights of the plurality of single tabs 221 of the negative tab.

It should be noted that in some embodiments, it is not excluded that the first tab 22 and the second tab 23 may extend from opposite sides of the winding cell body 21. In this case, both the first tab 22 and the second tab 23 may be ring-shaped. Certainly, it is not excluded that the first tab 22 and the second tab 23 may be non-closed structures in the circumferential direction.

In an embodiment, a distance between the first tab 22 and the central hole 211 is greater than 0, and a distance between the second tab 23 and the central hole 211 is greater than 0. In this way, the insulation capability between the first tab 22 and the second tab 23 may be improved.

It should be noted that, in some embodiments, it is not excluded that the distance between the first tab 22 and the central hole 211 may be equal to zero, and the distance between the second tab 23 and the central hole 211 may be equal to 0.

In an embodiment, the winding cell body 21 includes a plurality of stacked units, and the plurality of stacked units are wound to form the winding cell body 21. The single tab 221 among the plurality of single tabs 221 closest to the central hole 211 is a first single tab. The single tab 221 among the plurality of single tabs 221 in the first region 24 farthest from the central hole 211 is a last single tab. The height of the first single tab is x, and the height of the highest single tab 221 is y, where $y-x=(n-1)t$. The last single tab is located on the $n^{th}$ stacked unit, and t is a thickness of the stacked unit, where $y \leq 15$ mm. On the basis of avoiding wrinkling and bending of the single tabs 221 during the bundling process, it can ensure that the top end of each single tab 221 has a better flatness. In this way, it is ensured that the first tab 22 can form reliable welding with the external structure.

As shown in FIG. 4, the single tab 221 among the plurality of single tabs 221 closest to the central hole 211 is the first single tab. That is, the lowermost single tab 221 in FIG. 4 is the first single tab. The single tab 221 among the plurality of single tabs 221 in the first region 24 farthest from the central hole 211 is the last single tab. That is, the uppermost single tab 221 in the first region 24 in FIG. 4 is the last single tab of the first region 24, and the last single tab is located on the $n^{th}$ stacked unit. The height of the first single tab is x, and the height y of the highest single tab 221 may be considered as the height of the single tabs 221 in the second region 25. By setting $y-x=(n-1)t$, where t is the thickness of the stacked unit, it can be ensured that the first tab 22 can have a reasonable thickness. Therefore, the welding capability of the first tab 22 is improved, the problem of the first tab 22 being welded through is avoided, and the problem of false welding of the first tab 22 may also be prevented from occurring.

Figure 5:
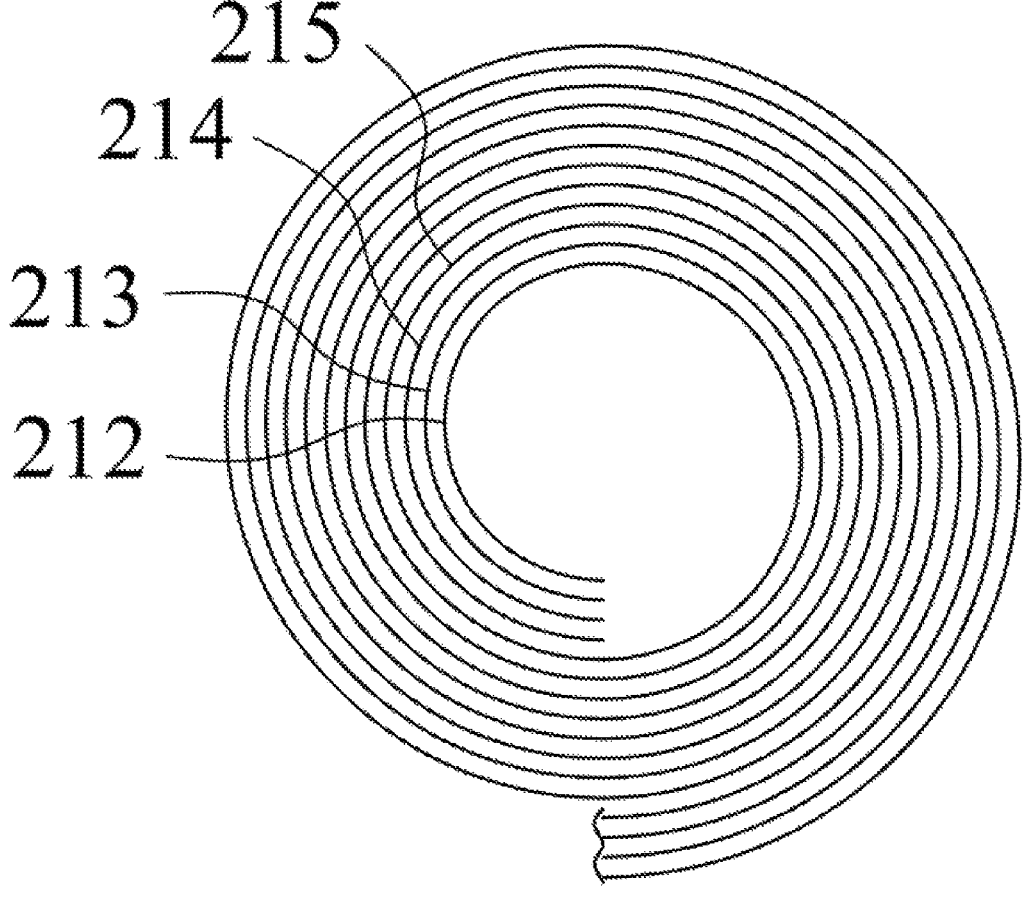
FIG. 5 is a schematic view illustrating part of a structure of stacked units of the battery according to an exemplary embodiment.

Note that as shown in FIG. 5, the stacked units may include a first electrode 212, a first separator 213, a second electrode 214, and a second separator 215 arranged in sequence. t is a sum of thicknesses of the first electrode 212, the first separator 213, the second electrode 214, and the second separator 215. Alternatively, it is not excluded that the stacked units may include the first electrode and the second electrode. The first electrode and the second electrode may be in direct contact, and t is the sum of the thicknesses of the first electrode and the second electrode.

In an embodiment, 5 mm $\leq y \leq$ 10 mm not only facilitates the bending of the first tab 22 but also ensures that the first tab 22 has a sufficient welding area. In this way, the electron transmission rate of the winding cell 20 is improved.

In an embodiment, the height y of the single tab 221 with the largest height may be 5 mm, 5.1 mm, 5.2 mm, 5.5 mm, 6 mm, 6.5 mm, 7 mm, 7.5 mm, 8 mm, 8.5 mm, 9 mm, 9.5 mm, 9.8 mm, 9.9 mm, 10 mm, 10.5 mm, 11 mm, 11.5 mm, 12 mm, 12.5 mm, 13 mm, 13.5 mm, 14 mm, 14.5 mm, 14.8 mm, 14.9 mm, or 15 mm and so on.

In an embodiment, as shown in FIG. 1, the cylindrical battery further includes a terminal structure 30. The terminal structure 30 may be disposed on the casing structure 10. The winding cell 20 may be electrically connected to terminal structure 30. For instance, the first tab 22 of the winding cell 20 may be electrically connected to terminal structure 30. The terminal structure 30 may be insulated from the casing structure 10, and the second tab 23 of the winding cell 20 may be electrically connected to the casing structure 10.

The cylindrical battery may include two terminal structures 30, and the first tab 22 and the second tab 23 of the winding cell 20 may be electrically connected to the two terminal structures 30.

In an embodiment, the casing structure 10 may include a cover plate and a casing member. The terminal structure 30 may be disposed on the cover plate, and the casing member may be formed with an accommodating space. In this way, after the cover plate is connected to the casing member, the winding cell 20 may be effectively protected. The cover plate and the casing member may be welded, or the cover plate and the casing member may be riveted.

An embodiment of the disclosure further provides a battery apparatus including the abovementioned cylindrical battery.

The cylindrical battery of the battery apparatus provided by an embodiment of the disclosure includes the winding cell 20. The winding cell 20 includes the winding cell body 21 and the first tab 22 extending from one side of the winding cell body 21. Further, the winding cell body 21 is wound to form the central hole 211. The first tab 22 may be formed by the plurality of single tabs 221, and the plurality of single tabs 221 form the first region 24. The heights of the plurality of single tabs 221 in the first region 24 gradually increase. Further, the difference value between the maximum height difference value and the minimum height difference value between adjacent single tabs 221 in the radial direction of the central hole 211 is less than or equal to 0.5 mm. In this way, when the single tabs 221 are bundled, top portions of the single tabs 221 may be substantially flush, so that the subsequent connection of the first tab 22 may be satisfied, and false connection may be avoided. The overall current-passing capability of the winding cell 20 is thereby enhanced, and the performance of the battery apparatus is thus improved.

In an embodiment, the battery apparatus is a battery module or a battery pack.

The battery module includes a plurality of cylindrical batteries. The battery module may also include a bracket, and the batteries may be fixed on the bracket.

The battery pack includes a plurality of cylindrical batteries and a box, and the box is configured to fix the cylindrical batteries.

Note that the battery pack includes cylindrical batteries, there may be a plurality of cylindrical batteries, and the plurality of cylindrical batteries are arranged in the box. Herein, the cylindrical batteries may be mounted in the box after forming a battery module. Alternatively, the cylindrical batteries may be directly arranged in the box, that is, the cylindrical batteries are not required to be arranged into groups, and the box is used to fix the cylindrical batteries.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A cylindrical battery, comprising:
a winding cell comprising a winding cell body and a first tab extending from one side of the winding cell body, wherein the winding cell body is wound to form a central hole, the first tab comprises a plurality of single tabs in a radial direction of the central hole, and the plurality of single tabs form a first region,
wherein heights of the plurality of single tabs in the first region gradually increase, a difference value between a maximum height difference value and a minimum height difference value between adjacent single tabs in the radial direction of the central hole is less than or equal to 0.5 mm, and the height of each of the single tabs is a dimension of the single tab in a lead-out direction thereof,
wherein a difference value between the single tab with the largest height and the single tab with the smallest height in the first region is greater than or equal to 0.08 mm, and
wherein the winding cell further comprises a second tab, polarities of the first tab and the second tab spaced apart from each other are opposite, and the first tab and the second tab extend from a same side of the winding cell body.

2. The cylindrical battery according to claim 1, wherein the heights of the plurality of single tabs gradually increase to form an arithmetic progression.

3. The cylindrical battery according to claim 1, wherein the first tab is a positive tab and a tolerance of an arithmetic progression formed by the heights of the plurality of single tabs in the first region is 0.2 mm to 0.4 mm, or the first tab is a negative tab and the tolerance of the arithmetic progression formed by the heights of the plurality of single tabs in the first region is 0.1 mm to 0.3 mm.

4. The cylindrical battery according to claim 1, wherein the first region is formed on one side of the first tab close to the central hole, the plurality of single tabs further form a second region, and the second region is formed on the other side of the first tab away from the central hole,
wherein the heights of the plurality of single tabs in the second region are all equal.

5. The cylindrical battery according to claim 4, wherein the heights of the single tabs in the first region are less than the height of the single tabs in the second region.

6. The cylindrical battery according to claim 5, wherein a height difference between the height of the single tabs in the second region and the height of the single tab in the first region adjacent to the second region is equal to a tolerance of an arithmetic progression formed by the heights of the plurality of single tabs in the first region.

7. The cylindrical battery according to claim 1, wherein a plurality of first tabs are provided, a plurality of second tabs are provided, and the first tabs and the second tabs are arranged in an alternating manner in a circumferential direction of the central hole.

8. The cylindrical battery according to claim 1, wherein the winding cell body comprises a plurality of stacked units, the plurality of stacked units comprises a first electrode and a second electrode, and the plurality of stacked units are wound to form the winding cell body, the single tab among the plurality of single tabs closest to the central hole is a first single tab, the single tab among the plurality of single tabs in the first region farthest from the central hole is a last single tab, the height of the first single tab is x, the height of the highest single tab is y, where $y-x=(n-1)\,t$, the last single tab is located on the $n^{th}$ stacked unit, and t is a thickness of the stacked unit, where $y \leq 15$ mm.

9. The cylindrical battery according to claim 8, wherein $5 \text{ mm} \leq y \leq 10$ mm.

10. The cylindrical battery according to claim 1, wherein in the radial direction of the central hole, the heights of the plurality of single tabs in the first region gradually increase to form an arithmetic progression.

11. The cylindrical battery according to claim 1, wherein a distance between the first tab and the central hole is greater than 0.

\*   \*   \*   \*   \*